(12) United States Patent
Small et al.

(10) Patent No.: US 10,961,331 B2
(45) Date of Patent: Mar. 30, 2021

(54) ETHYLENE HOMOPOLYMERS WITH A REVERSE SHORT CHAIN BRANCH DISTRIBUTION

(71) Applicant: Chevron Phillips Chemical Company LP, The Woodlands, TX (US)

(72) Inventors: Brooke L. Small, Kingwood, TX (US); Max P. McDaniel, Bartlesville, OK (US); Matthew F. Milner, Kingwood, TX (US); Paul J. DesLauriers, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 72 days.

(21) Appl. No.: 16/224,929

(22) Filed: Dec. 19, 2018

(65) Prior Publication Data

US 2020/0199265 A1      Jun. 25, 2020

(51) Int. Cl.
*C08F 10/02* (2006.01)

(52) U.S. Cl.
CPC .......... *C08F 10/02* (2013.01); *C08F 2420/01* (2013.01)

(58) Field of Classification Search
CPC combination set(s) only.
See application file for complete search history.

(56) References Cited

U.S. PATENT DOCUMENTS

| | | | |
|---|---|---|---|
| 3,242,099 A | 3/1966 | Manyik et al. | |
| 3,248,179 A | 4/1966 | Norwood | |
| 4,501,885 A | 2/1985 | Sherk et al. | |
| 4,588,790 A | 5/1986 | Jenkins, III et al. | |
| 4,794,096 A | 12/1988 | Ewen | |
| 4,808,561 A | 2/1989 | Welborn, Jr. | |
| 5,352,749 A | 10/1994 | Dechellis et al. | |
| 5,436,304 A | 7/1995 | Griffin et al. | |
| 5,565,175 A | 10/1996 | Hottovy et al. | |
| 5,575,979 A | 11/1996 | Hanson | |
| 5,576,259 A | 11/1996 | Hasegawa et al. | |
| 5,807,938 A | 9/1998 | Kaneko et al. | |
| 5,919,983 A | 7/1999 | Rosen et al. | |
| 6,107,230 A | 8/2000 | McDaniel et al. | |
| 6,165,929 A | 12/2000 | McDaniel et al. | |
| 6,239,235 B1 | 5/2001 | Hottovy et al. | |

(Continued)

FOREIGN PATENT DOCUMENTS

DE      19823871 A1      12/1999
EP      0729978 A1       9/1996

(Continued)

OTHER PUBLICATIONS

Antoni Jurkiewicz, et al., Macromolecules, vol. 32, No. 17, Aug. 24, 1999, pp. 5471-5476.

(Continued)

*Primary Examiner* — Catherine S Branch
(74) *Attorney, Agent, or Firm* — Merchant & Gould P.C.

(57) ABSTRACT

Disclosed herein are ethylene homopolymers generally characterized by a density of less than 0.94 g/cm³ and an inverse short chain branch distribution. These homopolymers can be further characterized by a ratio of Mw/Mn from 2 to 100, a number of short chain branches from 2 to 20 short chain branches per 1000 total carbon atoms, and wherein at least 50% of the short chain branches are methyl branches.

20 Claims, 2 Drawing Sheets

(56) References Cited

U.S. PATENT DOCUMENTS

| | | |
|---|---|---|
| 6,262,191 B1 | 7/2001 | Hottovy et al. |
| 6,291,608 B1 | 9/2001 | Eilerts et al. |
| 6,294,494 B1 | 9/2001 | McDaniel et al. |
| 6,300,271 B1 | 10/2001 | McDaniel et al. |
| 6,300,451 B1 | 10/2001 | Mehta et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,129,302 B2 | 10/2006 | Mink et al. |
| 7,199,073 B2 | 4/2007 | Martin et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,348,388 B2 | 3/2008 | Ittel et al. |
| 7,517,939 B2 | 4/2009 | Yang et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,619,047 B2 | 11/2009 | Yang et al. |
| 7,884,163 B2 | 2/2011 | McDaniel et al. |
| 8,114,946 B2 | 2/2012 | Yang et al. |
| 8,309,485 B2 | 11/2012 | Yang et al. |
| 8,435,911 B2 | 5/2013 | Schmitz et al. |
| 8,623,973 B1 | 1/2014 | McDaniel et al. |
| 8,822,608 B1 | 9/2014 | Bhandarkar et al. |
| 8,871,878 B2 | 10/2014 | Collins et al. |
| 9,023,959 B2 | 5/2015 | McDaniel et al. |
| 2014/0163181 A1* | 6/2014 | Yang .................. C08L 23/0815 526/64 |
| 2017/0335022 A1 | 11/2017 | Small et al. |

FOREIGN PATENT DOCUMENTS

| | | |
|---|---|---|
| EP | 1059311 A2 | 12/2000 |
| WO | 1999032226 A1 | 12/1998 |
| WO | 1999010391 A1 | 3/1999 |

OTHER PUBLICATIONS

Modern Plastics Encyclopedia, Mid-Nov. 1995 Issue, vol. 72, No. 12.

Film Extrusion Manual—Process, Materials, Properties, TAPPI Press, 1992.

Stephen Mecking, "Reactor Blending With Early/Late Transition Metal Catalyst Combinations in Ethylene Polymerization," Macromolecular Rapid Communications, Wiley-VCH, DE, vol. 20, No. 3, Mar. 1, 1999, pp. 139-143; XP000834998.

International Search Report and Written Opinion issued in corresponding application No. PCT/US2019/065125, dated Mar. 24, 2020, 13 pgs.

* cited by examiner

ETHYLENE HOMOPOLYMERS WITH A REVERSE SHORT CHAIN BRANCH DISTRIBUTION

BACKGROUND OF THE INVENTION

Polyolefins such as high density polyethylene (HDPE) homopolymer and linear low density polyethylene (LLDPE) copolymer can be produced using various combinations of catalyst systems and polymerization processes. In some end-use applications, it can be beneficial for the catalyst system employed to incorporate short chain branching, without the use of a comonomer, to produce lower density ethylene homopolymers. Further, it can be beneficial for the ethylene homopolymer to have a broad molecular weight distribution (MWD), to result in good extrusion processability and polymer melt strength and bubble stability in blown film applications. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene homopolymers. In one aspect, the ethylene homopolymer can be characterized by a density of less than or equal to about 0.94 g/cm$^3$, an inverse short chain branch distribution (SCBD), a number of short chain branches (SCB's) in a range from about 2 to about 20 SCB's per 1000 total carbon atoms, and wherein at least about 50% of the SCB's are methyl branches. In another aspect, the ethylene homopolymer can be characterized by a density of less than or equal to about 0.94 g/cm$^3$, an inverse short chain branch distribution (SCBD), and a ratio of Mw/Mn in a range from about 2 to about 100, and wherein at least about 50% of the SCB's are methyl branches. These ethylene homopolymers can be used to produce various articles of manufacture, such as films (e.g., blown films), sheets, pipes, and molded products.

Catalyst compositions also are provided by the present invention. Such catalyst compositions can comprise catalyst component I comprising a nickel diimine complex, catalyst component II comprising a metallocene compound, an activator, and optionally, a co-catalyst. The present invention also contemplates and encompasses polymerization processes, for example, contacting a catalyst composition with ethylene and optionally an olefin comonomer in a polymerization reactor system under polymerization conditions to produce an ethylene polymer. Generally, the catalyst composition employed can comprise any of the nickel diimine complexes, any of the metallocene compounds, and any of the activators disclosed herein. Further, organoaluminum compounds or other co-catalysts can be utilized in the polymerization processes.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
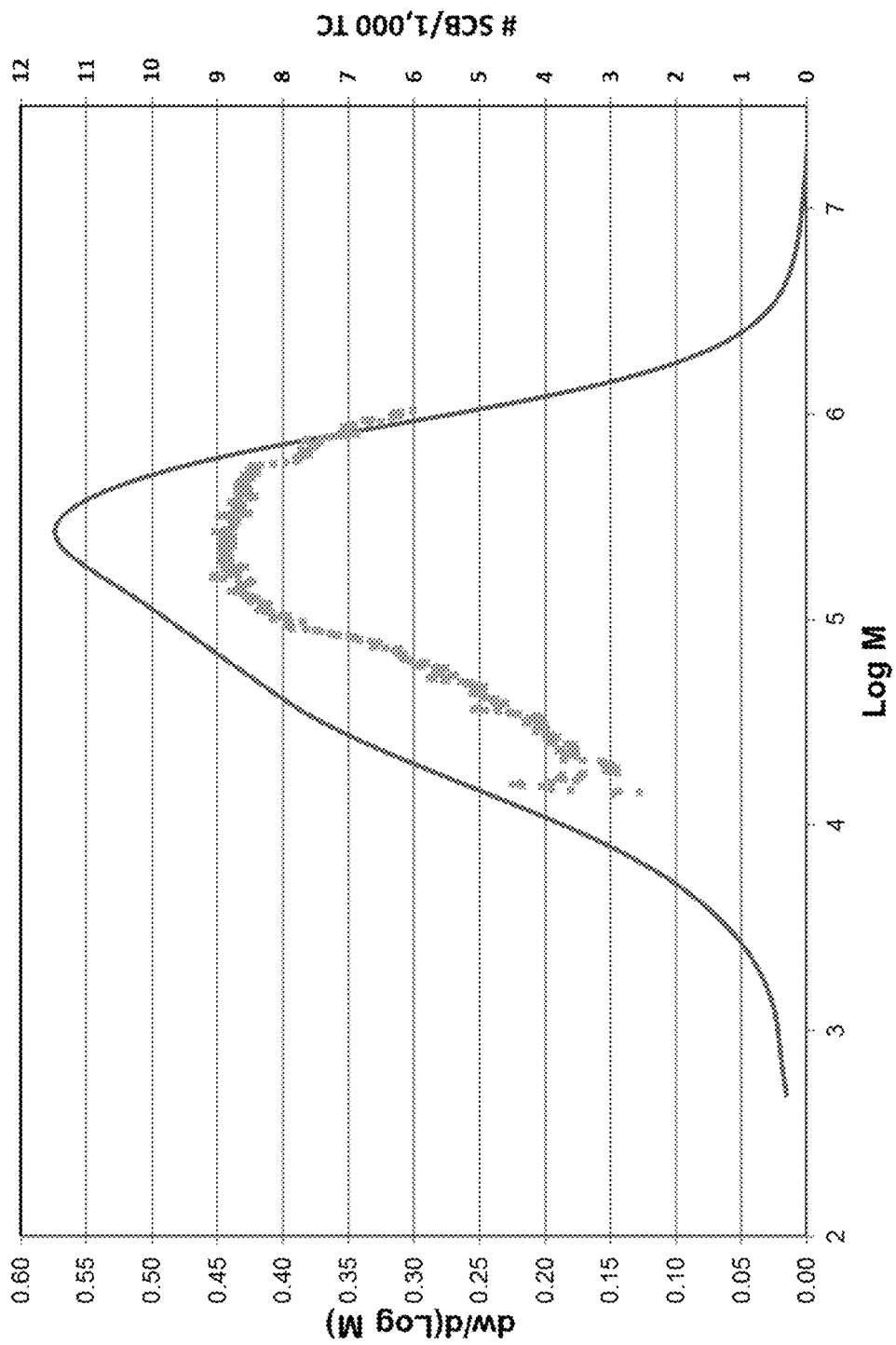
FIG. 1 presents a plot of the molecular weight distribution and short chain branch distribution of the polymer of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the polymers, compositions, and methods described herein are contemplated with or without explicit description of the particular combination. Additionally, unless explicitly recited otherwise, any aspect and/or feature disclosed herein can be combined to describe inventive polymers, compositions, and methods consistent with the present disclosure.

While polymers, compositions, and methods are described herein in terms of "comprising" various properties, components, or steps, the polymers, compositions, and methods also can "consist essentially of" or "consist of" the various properties, components, or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "polymer" is used herein generically to include ethylene homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from ethylene and any comonomer(s) disclosed herein. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers or oligomers.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, the nickel diimine complex, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mz/Mw of an ethylene polymer consistent with aspects of this invention. By a disclosure that the ratio of Mz/Mw can be in a range from about 3 to about 6, the intent is to recite that the ratio of Mz/Mw can be any ratio in the range and, for example, can be equal to about 3, about 3.5, about 4, about 4.5, about 5, about 5.5, or about 6. Additionally, the ratio of Mz/Mw can be within any range from about 3 to about 6 (for example, from about 3.5 to about 5.5), and this also includes any combination of ranges between about 3 and about 6 (for example, the Mz/Mw ratio can be in a range from about 3 to about 4, or from about 5 to about 6). Further, in all instances, where "about" a particular value is disclosed, then that value itself is disclosed. Thus, the disclosure of a Mz/Mw from about 3 to about 6 also discloses a Mz/Mw range from 3 to 6 (for example, from 3.5 to 5.5), and this also includes any combination of ranges between 3 and 6 (from 3 to 4, or from 5 to 6). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about"

also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to catalyst compositions, methods for preparing catalyst compositions, methods for using the catalyst compositions to polymerize olefins, the polymer resins produced using such catalyst compositions, and articles produced using these polymer resins. In particular, the present invention relates to producing ethylene homopolymers having a combination of a relatively low density and an inverse short chain branch distribution (SCBD).

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{20}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from about 0.1 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise (or consist essentially of, or consist of) an ethylene homopolymer, while in another aspect, the ethylene polymer can comprise (or consist essentially of, or consist of) an ethylene/α-olefin copolymer, and in yet another aspect, the ethylene polymer can comprise (or consist essentially of, or consist of) an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

If the resultant polymer produced in accordance with the present invention is, for example, an ethylene homopolymer, its properties can be characterized by various analytical techniques known and used in the polyolefin industry. Articles of manufacture can be formed from, and/or can comprise, the ethylene polymers of this invention, whose typical properties are provided below.

In particular aspects and unexpectedly, the ethylene homopolymers disclosed herein often have a unique combination of a low density and an inverse short chain branch distribution. Herein, an ethylene homopolymer is meant to encompass polymers produced from ethylene—with no comonomer—and polymers in which inconsequential amounts of an α-olefin comonomer (e.g., impurities) also are present during polymerization. Generally, the weight percentage of the α-olefin comonomer based on ethylene will be less than about 0.05 wt. % (500 ppm) or less than about 0.01 wt. % (100 ppm). An illustrative and non-limiting example of an ethylene homopolymer consistent with aspects of this invention can have a density of less than or equal to about 0.94 g/cm$^3$, an inverse short chain branch distribution (SCBD), and a number of short chain branches (SCB's) in a range from about 2 to about 20 SCB's per 1000 total carbon atoms; and wherein at least about 50% of the SCB's are methyl branches. Another illustrative and non-limiting example of an ethylene homopolymer of the present invention can have a density of less than or equal to about 0.94 g/cm$^3$, an inverse short chain branch distribution (SCBD), and a ratio of Mw/Mn in a range from about 2 to about 100; and wherein at least about 50% of the SCB's are methyl branches. These illustrative and non-limiting examples of ethylene homopolymers consistent with the present invention also can have any of the homopolymer properties listed below and in any combination, unless indicated otherwise.

The densities of ethylene homopolymers disclosed herein often are less than or equal to about 0.94 g/cm$^3$, for example, less than or equal to about 0.93 g/cm$^3$, or less than or equal to about 0.925 g/cm$^3$. Yet, in particular aspects, the density can be in a range from about 0.89 to about 0.94 g/cm$^3$, from about 0.90 to about 0.94 g/cm$^3$, from about 0.91 to about 0.94 g/cm$^3$, from about 0.90 to about 0.932 g/cm$^3$, from about 0.91 to about 0.932 g/cm$^3$, from about 0.89 to about 0.93 g/cm$^3$, from about 0.905 to about 0.93 g/cm$^3$, from about 0.91 to about 0.93 g/cm$^3$, from about 0.90 to about 0.925 g/cm$^3$, or from about 0.905 to about 0.922 g/cm$^3$.

While not being limited thereto, ethylene homopolymers described herein often can have a melt index (MI, $I_2$) in a range from 0 to about 25 g/10 min, from 0 to about 10 g/10 min, or from 0 to about 5 g/10 min. In further aspects, ethylene homopolymers described herein can have a melt index (MI) in a range from about 0.1 to about 5 g/10 min, from about 0.1 to about 3 g/10 min, from about 0.1 to about 1 g/10 min, from about 0.3 to about 5 g/10 min, from about 0.5 to about 4 g/10 min, or from about 0.5 to about 2 g/10 min.

In an aspect, ethylene homopolymers described herein can have a ratio of Mw/Mn, or the polydispersity index, in a range from about 2 to about 100, from about 2 to about 20, from about 3 to about 30, from about 3 to about 20, from about 4 to about 100, from about 4 to about 80, from about 4 to about 30, from about 4 to about 20, from about 5 to about 75, or from about 5 to about 50. In another aspect, ethylene homopolymers described herein can have a Mw/Mn in a range from about 5 to about 30, from about 5 to about 20, from about 6 to about 16, or from about 8 to about 15.

In an aspect, ethylene homopolymers described herein can have a ratio of Mz/Mw in a range from about 2 to about 8, from about 2 to about 7, or from about 2 to about 6. In another aspect, ethylene homopolymers described herein can have a Mz/Mw in a range from about 2.5 to about 8, from about 2.5 to about 7, from about 2.5 to about 5, or from about 3 to about 6.

In an aspect, ethylene homopolymers described herein can have a weight-average molecular weight (Mw) in a range from about 80,000 to about 800,000 g/mol, from about 80,000 to about 500,000 g/mol, or from about 85,000 to about 200,000 g/mol. In another aspect, ethylene homopolymers described herein can have a Mw in a range from about 100,000 to about 750,000 g/mol, from about 100,000 to about 350,000 g/mol, from about 150,000 to about 800,000 g/mol, or from about 200,000 to about 600,000 g/mol.

In an aspect, ethylene homopolymers described herein can have a number-average molecular weight (Mn) in a range from about 8,000 to about 70,000 g/mol, from about 10,000 to about 60,000 g/mol, from about 10,000 to about 40,000 g/mol, or from about 15,000 to about 55,000 g/mol. In another aspect, ethylene homopolymers described herein can have a Mn in a range from about 15,000 to about 45,000 g/mol, from about 15,000 to about 35,000 g/mol, or from about 20,000 to about 40,000 g/mol.

In an aspect, ethylene homopolymers described herein can have a z-average molecular weight (Mz) in a range from about 300,000 to about 3,000,000 g/mol, from about 400,000 to about 2,500,000 g/mol, from about 400,000 to about 2,000,000 g/mol, or from about 500,000 to about 2,500,000 g/mol. In another aspect, ethylene homopolymers described herein can have a Mz in a range from about 500,000 to about 2,000,000 g/mol, from about 500,000 to about 1,500,000 g/mol, from about 750,000 to about 2,000,000 g/mol, or from about 750,000 to about 1,250,000 g/mol.

Despite the relatively low density, the disclosed ethylene homopolymers have a relatively high peak melting point, often falling within a range from about 118 to about 135° C., from about 118 to about 130° C., from about 120 to about 135° C., or from about 120 to about 132° C. In further aspects, the ethylene homopolymer often has a peak melting point in a temperature range from about 120 to about 130° C., about 122 to about 135° C., from about 122 to about 132° C., from about 122 to about 130° C., or from about 122 to about 128° C. The peak melting point is determined via second heat DSC (differential scanning calorimetry).

While not being limited thereto, the percent crystallinity of the ethylene homopolymer often ranges from about 30% to about 75%. For example, the ethylene homopolymer can have a percent crystallinity from about 35% to about 70%; alternatively, from about 40% to about 65%; alternatively, from about 45% to about 60%; or alternatively, from about 40% to about 55%. The percent crystallinity is the ratio of the enthalpy of melting (second heat DSC) divided by the enthalpy of melting for 100% crystalline PE (taken as 290 J/g).

The ethylene homopolymers typically have moderate levels of long chain branches (LCB's). For instance, the ethylene homopolymer can contain from about 0.05 to about 10, from about 0.1 to about 8, from about 0.4 to about 6, from about 0.4 to about 4, from about 0.2 to about 3, from about 0.3 to about 2, or from about 0.5 to about 1.5, LCB's per 1000 total carbon atoms. LCB's are determined using NMR, and LCB's encompass branches with six (6) or more carbons.

Moreover, the ethylene homopolymers typically have an inverse short chain branch distribution (a reverse or inverse SCBD; increasing branching distribution); there is relatively more branching at the higher molecular weights. An inverse SCBD can be characterized by the number of short chain branches (SCB's) per 1000 total carbon atoms of the ethylene homopolymer at Mw that is greater than at Mn, and/or the number of SCB's per 1000 total carbon atoms of the ethylene homopolymer at Mz that is greater than at Mn. FIG. 1 illustrates an ethylene homopolymer with an inverse SCBD.

While not being limited thereto, the ethylene homopolymer can have from about 2 to about 20 short chain branches (SCB's) per 1000 total carbon atoms. In one aspect, the number of SCB's per 1000 total carbon atoms can be from about 3 to about 15 (or from about 3 to about 10), while in another aspect, from about 4 to about 12 (or from about 4 to about 9), and in yet another aspect, from about 5 to about 15 (or from about 5 to about 12). The SCB content is determined using NMR.

Often, at least half of the SCB's in the homopolymer are methyl branches, and this can range up to 90%, or 95%, or more. In one aspect, the ethylene homopolymer can have an amount of SCB's that are methyl branches of at least about 55%, and in further aspects, at least about 60%, at least about 70%, at least about 75%, at least about 80%, or at least about 85%, of the SCB's are methyl branches.

Generally, ethylene homopolymers consistent with certain aspects of the invention can have a bimodal (or multimodal) molecular weight distribution (as determined using gel permeation chromatography (GPC) or other suitable analytical technique).

In an aspect, the ethylene homopolymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Furthermore, the ethylene homopolymers disclosed herein can contain one or more additives. Non-limiting examples of such additives can include an antioxidant, an acid scavenger, an antiblock additive, a slip additive, a colorant, a filler, a processing aid, a UV inhibitor, and the like, as well as combinations thereof.

Articles and Products

Articles of manufacture can be formed from, and/or can comprise, the ethylene polymers (e.g., ethylene homopolymers) of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein (e.g., ethylene homopolymers), and the article of manufacture can be or can comprise a film (e.g., a blown film), a pipe, or a molded product.

Also contemplated herein is a method for forming or preparing an article of manufacture comprising any ethylene polymer disclosed herein. For instance, a method can comprise (i) contacting a catalyst composition with ethylene and an optional olefin comonomer under polymerization conditions in a polymerization reactor system to produce an ethylene polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the ethylene polymer. The forming step can comprise blending, melt processing, extruding, molding, or thermoforming, and the like, including combinations thereof.

Catalyst Systems and Polymerization Processes

In accordance with some aspects of the present invention, the ethylene polymer (e.g., the ethylene homopolymer) can be produced using a dual catalyst system. In these aspects, catalyst component I can comprise any suitable nickel diimine complex or any nickel diimine complex disclosed herein. Catalyst component II can comprise any suitable metallocene compound or any metallocene compound disclosed herein. The catalyst system can comprise any suitable activator or any activator disclosed herein, and optionally, any suitable co-catalyst or any co-catalyst disclosed herein.

Catalyst component I can comprise, in particular aspects of this invention, a nickel diimine complex. Catalyst component I, for instance, can comprise a compound having the following formula:

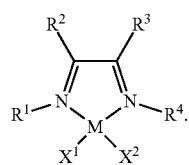

(I)

In formula (I), the transition metal M can be Ni; $X^1$ and $X^2$ independently can be a monoanionic ligand, or $X^1$ and $X^2$ taken together can form a bidentate dianionic ligand; $R^1$ and $R^4$ independently can be a $C_1$ to $C_{18}$ hydrocarbyl or substituted hydrocarbyl; and $R^2$ and $R^3$ independently can be hydrogen or a $C_1$ to $C_{18}$ hydrocarbyl or substituted hydrocarbyl, or $R^2$ and $R^3$ taken together can be a $C_2$ to $C_{18}$ hydrocarbylene or substituted hydrocarbylene to form a carbocyclic ring.

The ligands coordinated to the transition metal M (nickel) in the compound of formula (I) include $X^1$ and $X^2$, which can be monoanionic ligands, but can also be bidentate or multidentate dianionic ligands. For example, $X^1$ and $X^2$ independently can be a halide, hydride, $C_1$ to $C_{18}$ hydrocarbyl or $C_1$ to $C_{18}$ hydrocarbyloxide, or $X^1$ and $X^2$ taken together can be a $C_1$ to $C_{18}$ hydrocarbylenedioxide. In an aspect, $X^1$ and $X^2$ independently can be chloride, bromide, iodide, hydride, a $C_1$ to $C_{18}$ hydrocarbyl, or a $C_1$ to $C_{18}$ hydrocarbyloxide. In another aspect, $X^1$ and $X^2$ independently can be chloride, bromide, hydride, or a $C_1$-$C_4$ alkoxide. In yet another aspect, $X^1$ and $X^2$ taken together can be a lactate, glycolate, salicylate, catecholate, oxalate or malonate. In still another aspect, $X^1$ and $X^2$ can be chloride.

The ligands coordinated to the transition metal M (nickel) in compound (I) can include diimine ligands represented by the general formula:

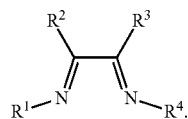

In this formula, the substituents $R^1$ and $R^4$ independently can be a $C_1$ to $C_{18}$ hydrocarbyl or substituted hydrocarbyl. The substituents $R^2$ and $R^3$ independently can be hydrogen, a $C_1$ to $C_{18}$ hydrocarbyl or substituted hydrocarbyl, or $R^2$ and $R^3$ taken together can be a $C_2$ to $C_{18}$ hydrocarbylene or substituted hydrocarbylene to form a carbocyclic ring. For example, $R^2$ and $R^3$ independently can be a $C_2$ to $C_{18}$ hydrocarbyl or substituted hydrocarbyl, a $C_3$ to $C_{18}$ hydrocarbyl or substituted hydrocarbyl, a $C_4$ to $C_{16}$ hydrocarbyl or substituted hydrocarbyl, a $C_5$ to $C_{14}$ hydrocarbyl or substituted hydrocarbyl, or a $C_6$ to $C_{12}$ hydrocarbyl or substituted hydrocarbyl. In another example, $R^2$ and $R^3$ taken together can form a carbocyclic ring as a $C_2$ to $C_{18}$ hydrocarbylene or substituted hydrocarbylene, a $C_4$ to $C_{18}$ hydrocarbylene or substituted hydrocarbylene, a $C_6$ to $C_{18}$ hydrocarbylene or substituted hydrocarbylene, or a $C_{10}$ to $C_{18}$ hydrocarbylene or substituted hydrocarbylene. Therefore, in formula (I), $R^1$ and $R^4$ can be different or, alternatively, $R^1$ and $R^4$ can be the same.

By way of example, $R^1$ and $R^4$ independently can be an aryl or substituted aryl, such as a 2,6-disubstituted aryl or a 2,4,6-trisubstituted aryl, and wherein any substituent is independently a $C_1$ to $C_{12}$ hydrocarbyl. Thus, $R^1$ and $R^4$ independently can be phenyl, 2,4,6-trimethylphenyl (mesityl), 2,6-diethylphenyl, 2,6-diisopropylphenyl, 2-ethyl-6-methylphenyl, 2-isopropyl-6-methylphenyl, 2-isopropyl-6-ethylphenyl, 2-methylphenyl, 2-ethylphenyl, 2-isopropylphenyl, 2,6-diisopropyl-4-benzylphenyl, 2,6-diisopropyl-4-(1,1-dimethylbenzyl)phenyl, 4-methylphenyl, or 2-t-butylphenyl.

Also by way of example, $R^2$ and $R^3$ independently can hydrogen or a $C_1$ to $C_{18}$ hydrocarbyl or substituted hydrocarbyl. For example, $R^2$ and $R^3$ independently can be hydrogen, methyl, ethyl, or an aryl or substituted aryl. In an aspect, $R^2$ and $R^3$ taken together can be a $C_2$ to $C_{18}$ hydrocarbylene or substituted hydrocarbylene to form a carbocyclic ring. For example, $R^2$ and $R^3$ taken together can be a $C_{10}$ hydrocarbylene group having the following formula:

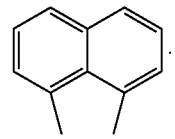

In some aspects, the nickel complex suitable for use as catalyst component I can have a diimine ligand represented by any one of the following formulas:

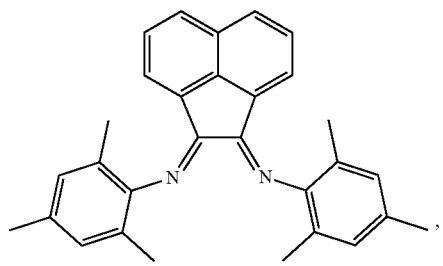

11
-continued
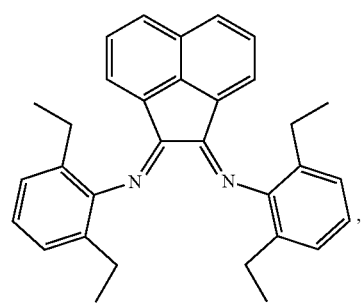
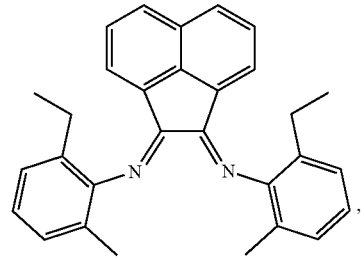
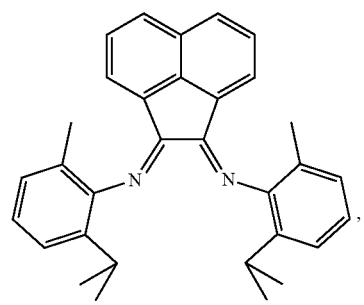
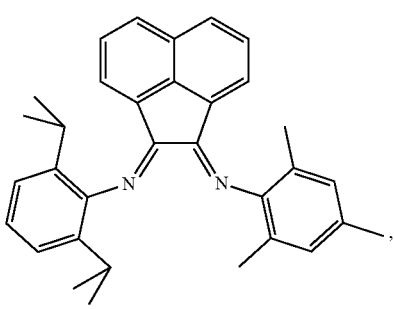
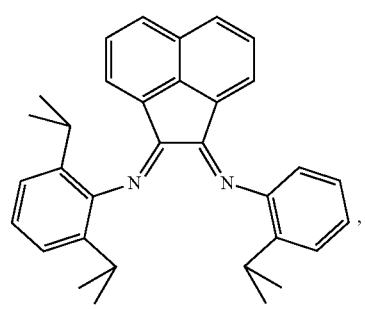
12
-continued
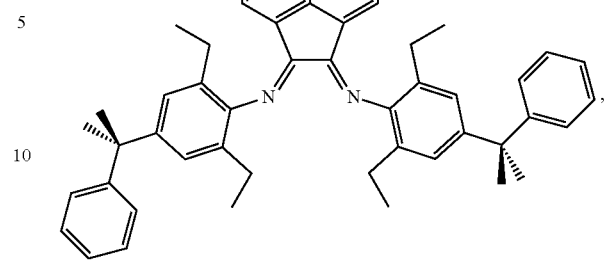
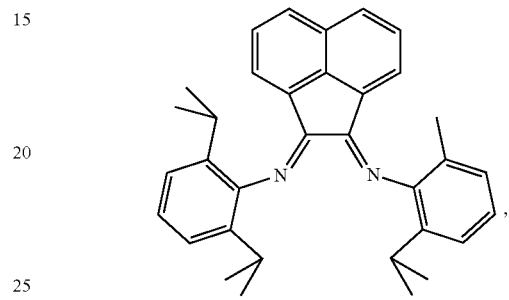
including a combination of any of these, which can be used to form a mixture of nickel complexes having various combinations of these ligands.
Therefore, illustrative and non-limiting examples of nickel complexes suitable for use as catalyst component I can include the following compounds:
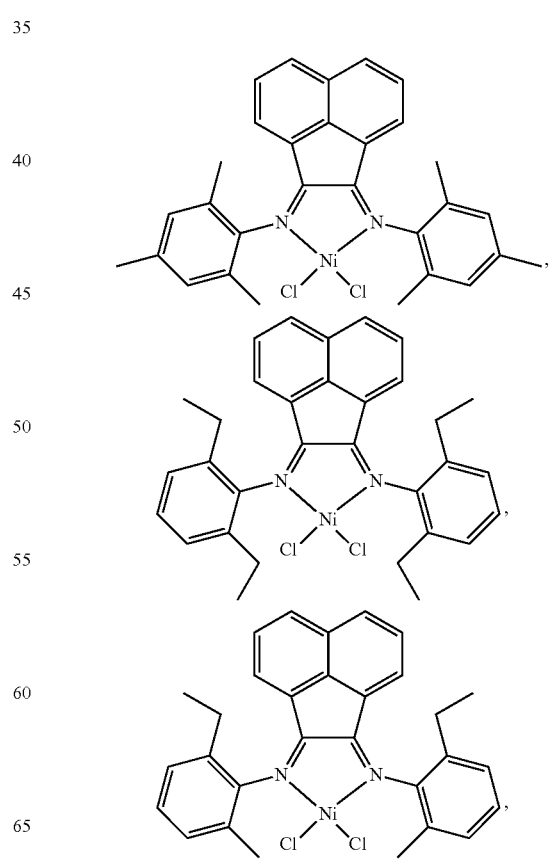

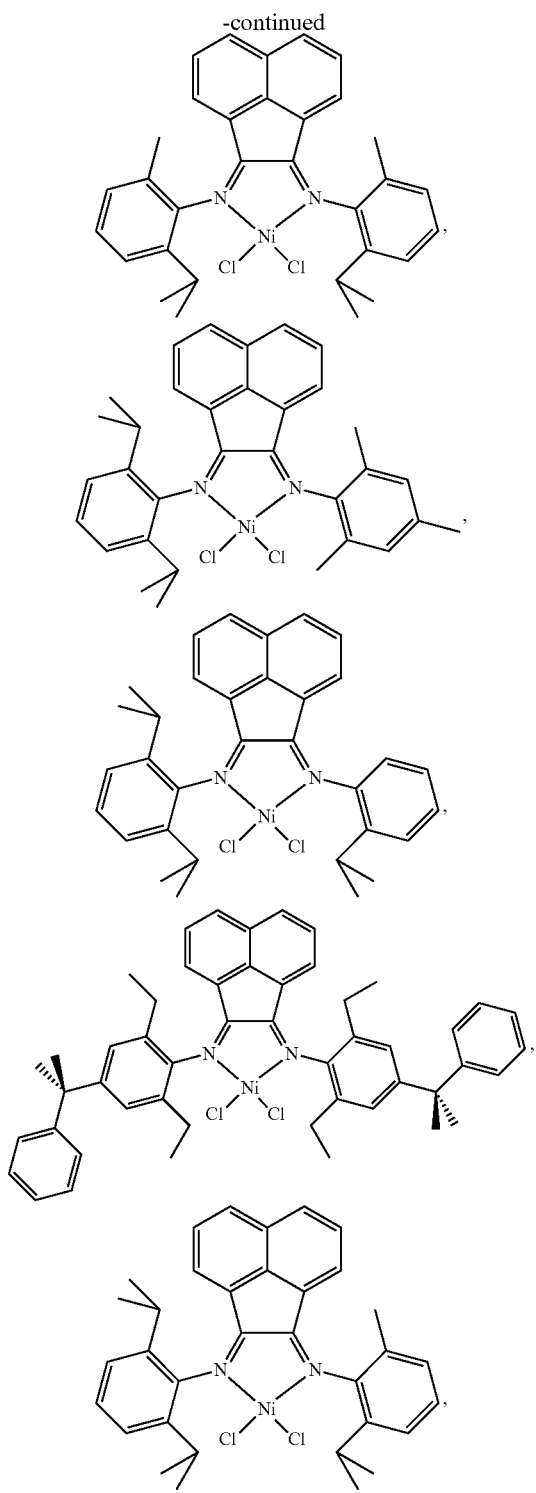

and the
  like, as well as combinations thereof.

Catalyst component I is not limited solely to the nickel complexes such as described above. Other suitable nickel complexes are disclosed in U.S. Patent Publication No. 2017/0335022, which is incorporated herein by reference in its entirety.

Generally, catalyst component II can comprise any suitable metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In another aspect, catalyst component II can comprise a single atom bridged metallocene compound containing a cyclopentadienyl group. In another aspect, catalyst component II can comprise a single atom bridged metallocene compound containing a fluorenyl group. In yet another aspect, catalyst component II can comprise a single atom bridged metallocene compound having an alkyl and/or an aryl group substituent on the bridging atom (e.g., a carbon or silicon bridging atom). In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group.

In these and other aspects, any cyclopentadienyl group, indenyl group, or fluorenyl group in the bridged metallocene compound, independently, can be unsubstituted, or can be substituted with any suitable substituent, any number of substituents, and at any position on the respective group, which conforms to the rules of chemical valence. Additionally, the bridging group can be a bridging atom (e.g., carbon, silicon, or germanium) or a chain of bridging atoms, and the bridging atom or chain can be unsubstituted or can be substituted with any suitable substituent, any number of substituents, and at any position on the respective bridging group, which conforms to the rules of chemical valence.

Illustrative and non-limiting examples of bridged metallocene compounds suitable for use as catalyst component II can include the following compounds (Me=methyl, Ph=phenyl; t-Bu=tert-butyl):

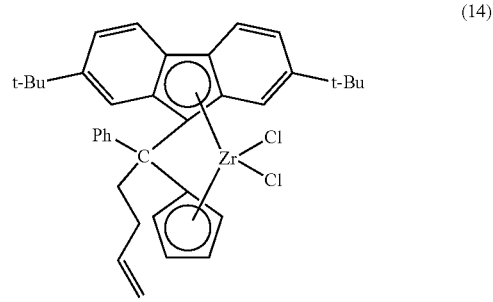

(14)

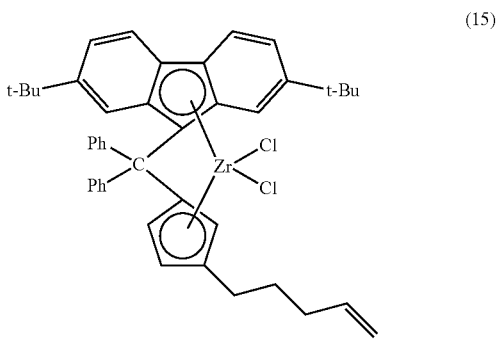

(15)

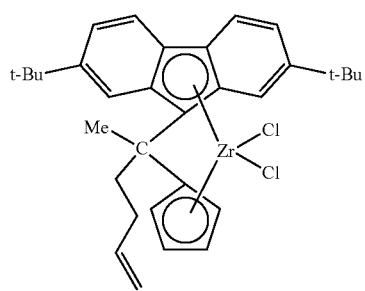
(16)
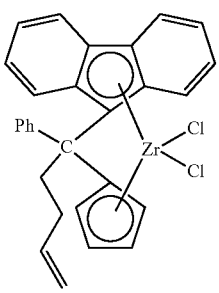
(17)
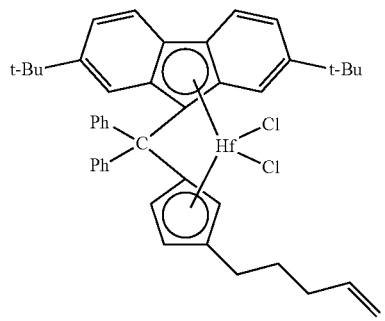
(18)
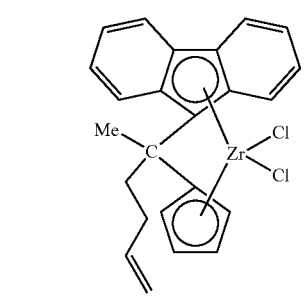
(19)
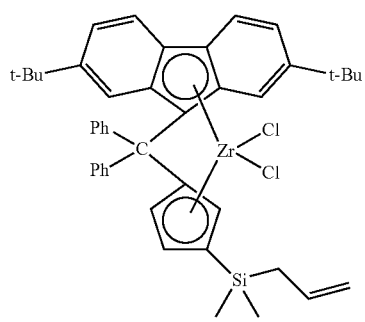
(20)
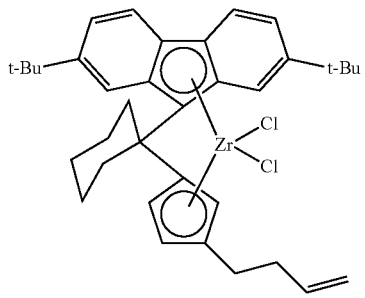
(21)
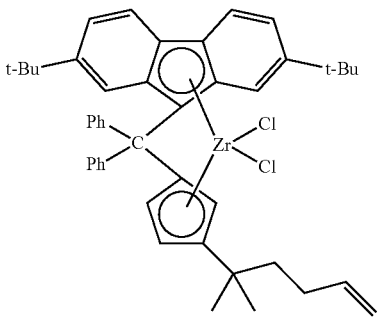
(22)
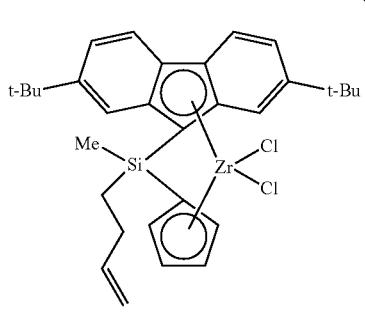
(23)
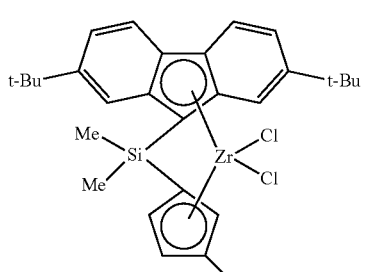
(24)
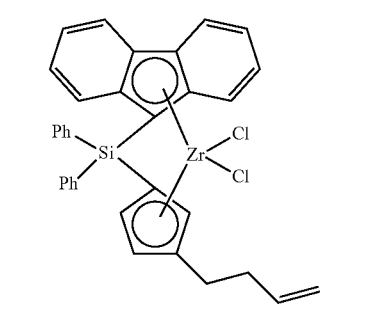
(25)
and the like, as well as combinations thereof.
Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

Alternatively, catalyst component II can comprise an unbridged metallocene compound, for instance, containing titanium, zirconium, or hafnium. In one aspect, catalyst component II can comprise an unbridged zirconium or hafnium based metallocene compound containing two cyclopentadienyl groups, two indenyl groups, or a cyclopentadienyl and an indenyl group. In another aspect, catalyst component II can comprise an unbridged zirconium or hafnium based metallocene compound containing two cyclopentadienyl groups. In yet another aspect, catalyst component II can comprise an unbridged zirconium or hafnium based metallocene compound containing two indenyl groups. In still another aspect, catalyst component II can comprise an unbridged zirconium or hafnium based metallocene compound containing a cyclopentadienyl and an indenyl group. In some aspects, catalyst component II can comprise an unbridged zirconium based metallocene compound containing two cyclopentadienyl groups, two indenyl groups, or a cyclopentadienyl and an indenyl group.

Any cyclopentadienyl group, indenyl group, or fluorenyl group in the unbridged metallocene compound, independently, can be unsubstituted, or can be substituted with any suitable substituent, any number of substituents, and at any position on the respective group, which conforms to the rules of chemical valence. For instance, the unbridged metallocene compound can contain two unsubstituted cyclopentadienyl groups (or two unsubstituted indenyl groups), or the unbridged metallocene compound can contain two substituted cyclopentadienyl groups (or two substituted indenyl groups), and these groups can have an alkyl substituent, e.g., an alkyl-substituted cyclopentadienyl group. When the unbridged metallocene compound contains two cyclopentadienyl groups (or two indenyl groups), the cyclopentadienyl groups (or indenyl groups) can be the same or different.

Illustrative and non-limiting examples of unbridged metallocene compounds that are suitable for use as catalyst component II can include the following compounds (Ph=phenyl):

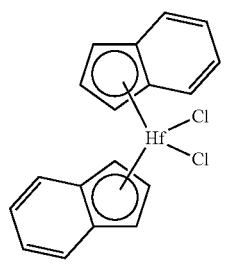

(1)

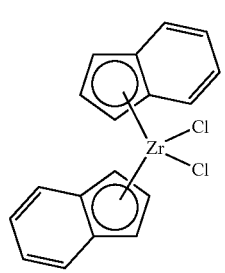

(2)

-continued

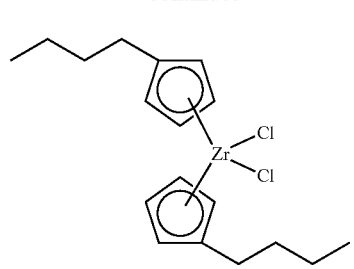

(3)

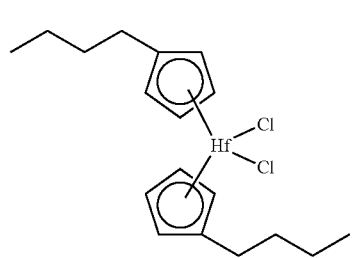

(4)

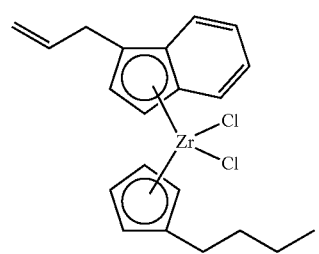

(5)

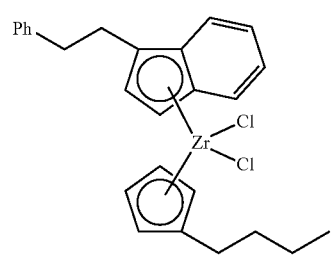

(6)

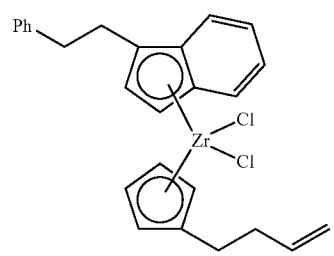

(7)

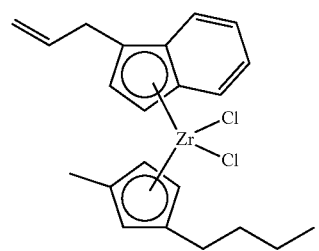

(8)

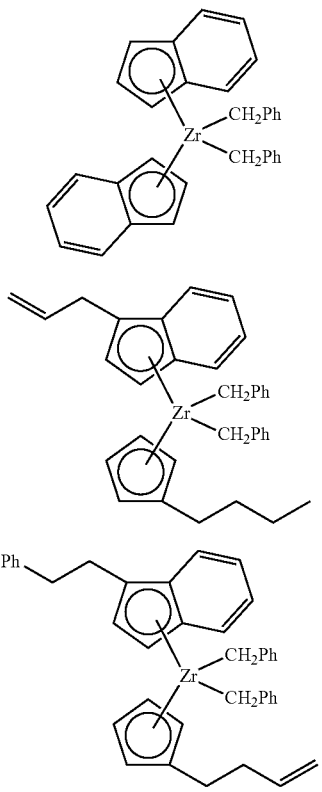

(9)

(10)

(11)

and the like, as well as combinations thereof.

Catalyst component I is not limited solely to unbridged metallocene compounds such as described above. Other suitable unbridged metallocene compounds are disclosed in U.S. Pat. Nos. 7,199,073, 7,226,886, 7,312,283, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide. For instance, the activator-support can comprise fluorided alumina, sulfated alumina, fluorided silica-alumina, sulfated silica-alumina, fluorided silica-coated alumina, sulfated silica-coated alumina, or any combination thereof.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 5,000 grams of ethylene polymer (ethylene homopolymer and/or copolymer, as the context requires) per gram of nickel (or per gram of transition metal of the metallocene compound) per hour (abbreviated g/g/hr). In another aspect, the catalyst activity can be greater than about 10,000, greater than about 15,000, or greater than about 20,000 g/g/hr, and often as high as 250,000-500,000 g/g/hr. Illustrative and non-limiting ranges for the catalyst activity include from about 5,000 to about 500,000, from about 10,000 to about 250,000, or from about 20,000 to about 100,000 g/g/hr, and the like. These activities are measured under slurry polymerization conditions, with a triisobutylaluminum co-catalyst, using pentane as the diluent, at a polymerization temperature of about 60° C. and a reactor pressure of about 300 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Ethylene polymers (e.g., ethylene homopolymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with ethylene and optionally an olefin comonomer (one or more) in a polymerization reactor system under polymerization conditions to produce an ethylene polymer, wherein the catalyst composition can comprise, as disclosed herein, catalyst component I, catalyst component II, an activator, and an optional co-catalyst. This invention also encompasses any ethylene polymers (e.g., ethylene homopolymers) produced by any of the polymerization processes disclosed herein.

As used herein, a "polymerization reactor" includes any polymerization reactor capable of polymerizing ethylene, alone or with a comonomer to produce ethylene homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the ethylene polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the ethylene polymer (or ethylene homopolymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Ethylene monomer and if desired, an olefin comonomer, can be employed with catalyst compositions and polymerization processes of this invention. The olefin comonomer typically can include an olefin compound having from 3 to 30 carbon atoms per molecule and having at least one olefinic double bond. In an aspect, the olefin comonomer can comprise a $C_3$-$C_{20}$ olefin; alternatively, a $C_3$-$C_{20}$ alpha-olefin; alternatively, a $C_3$-$C_{10}$ olefin; alternatively, a $C_3$-$C_{10}$ alpha-olefin; alternatively, 1-butene, 1-pentene, 1-hexene, 1-octene, 1-decene, or any combination thereof; alternatively, 1-butene, 1-hexene, 1-octene, or any combination thereof; alternatively, 1-butene; alternatively, 1-hexene; or alternatively, 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 at 190° C. with a 2,160 gram weight, and high load melt index (HLMI, g/10 min) can be determined in accordance with ASTM D1238 at 190° C. with a 21,600 gram weight. Density was determined in grams per cubic centimeter ($g/cm^3$) on a compression molded sample, cooled at 15° C. per hour, and conditioned for 40 hours at room temperature in accordance with ASTM D1505 and ASTM D4703.

The peak melting point was determined using Differential Scanning calorimetry (DSC) as described in ASTM D3418 (2nd heat, ° C.) at a heating rate of 10° C./min. Percent crystallinity (%) was determined by dividing the enthalpy of melting (in J/g) from the 2nd heat DSC curve by 290 J/g (approximate value of the enthalpy of 100% crystalline polyethylene).

The number of short chain branches (SCB's) per 1000 total carbon atoms was determined using NMR, according to the procedure used in Jurkiewicz et al, Macromolecules 1999, 32(17), 5471. The total number of SCB's per 1000 total carbon atoms were determined, as well as the number of methyl branches, ethyl branches, propyl branches, butyl branches, and pentyl branches per 1000 total carbon atoms. Long chain branches (LCB's) also were determined using NMR, and for the purposes of this disclosure, LCB's encompass any branches with six (6) or more carbon atoms.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Short chain branch distribution (SCBD) across the molecular weight distribution was determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branch content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branch distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Fluorided silica-coated alumina activator-supports (FSCA) were prepared as follows. Bohemite was obtained from W.R. Grace & Company under the designation "Alumina A" and having a surface area of 300 $m^2/g$, a pore volume of 1.3 mL/g, and an average particle size of 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Example 1

The polymerization experiment of Example 1 was conducted for 60 min in a 500-mL reactor. First, 361 mg of FSCA and 0.30 mL of neat TIBA were added with 100 mL of anhydrous n-pentane to the reactor. Then, 5.1 mg of a nickel diimine catalyst (dissolved in a few mL of toluene) and 3.6 mg of a metallocene compound (dissolved in a few mL of toluene) were added with 100 mL of anhydrous n-pentane to the reactor. The structures for the nickel complex and zirconium-based metallocene are shown below.

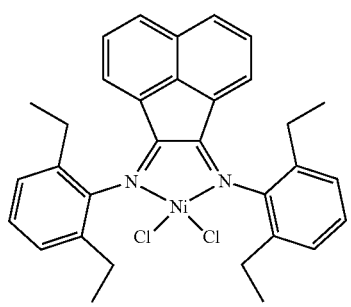

-continued

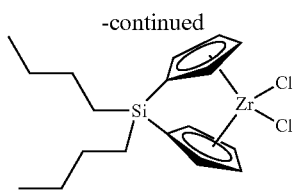

The reactor was pressurized with 300 psig of ethylene at a reactor temperature of 26° C. While stirring, the reaction temperature increased rapidly to 60° C., and maintained within 3 degrees with cooling for the duration of 60-minute experiment. Ethylene was fed on demand to maintain the reactor pressure of 300 psig; no hydrogen or comonomer was added. After venting of the reactor and removal of solvent, 33.1 g of polyethylene was isolated, which converts to catalyst activities of 63,700 g/g/hr (based on nickel) and 34,600 g/g/hr (based on zirconium).

The inverse short chain branch distribution of the homopolymer of Example 1 is shown by FIG. 1, which illustrates the molecular weight distribution and short chain branch distribution of the homopolymer. In FIG. 1, there are relatively more short chain branches (SCB's) at the higher molecular weights; the number of SCB's per 1000 total carbon (TC) atoms of the polymer at Mw is greater than at Mn (and at Mz is greater than at Mn).

Figure 2:
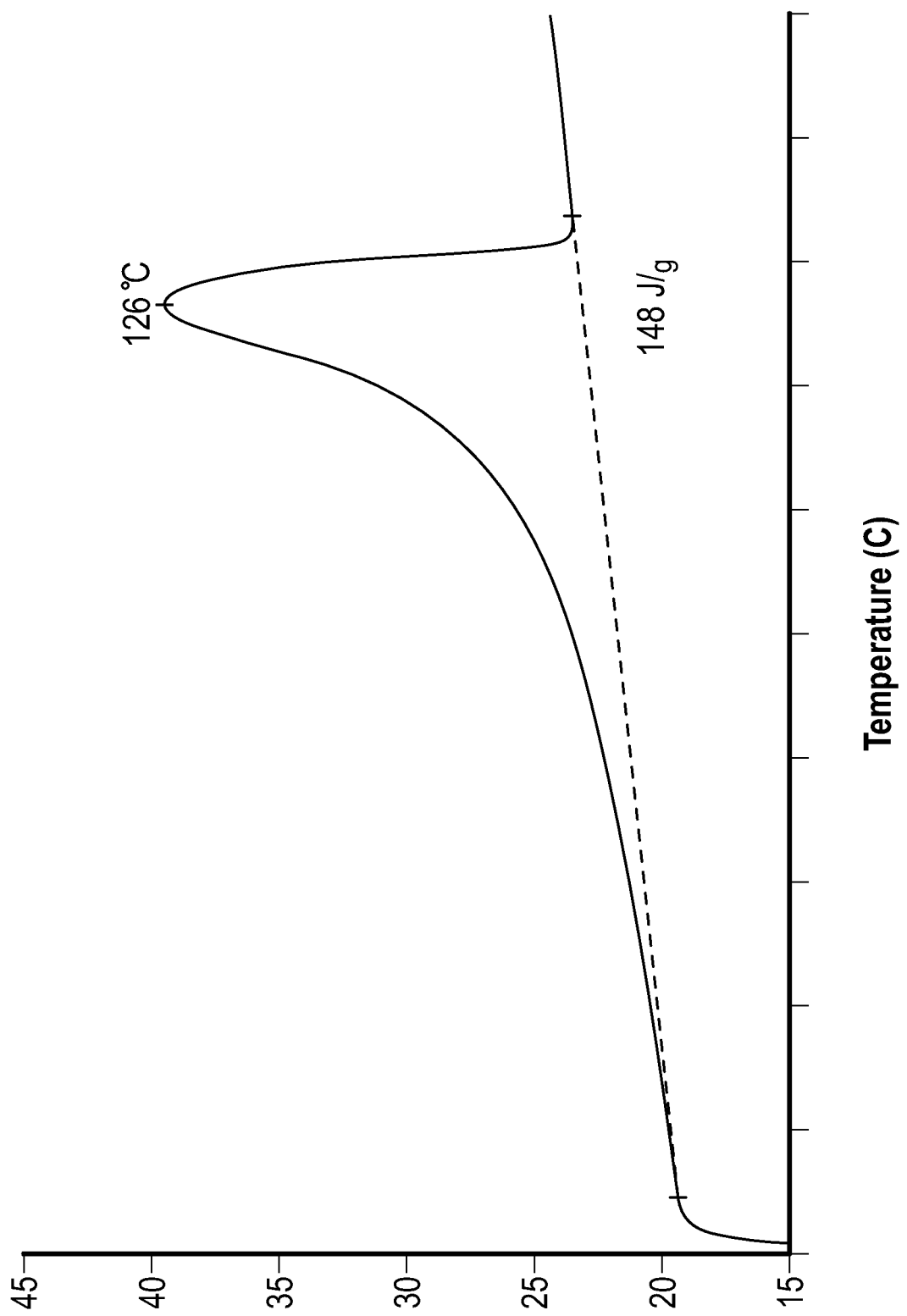
FIG. 2 presents a differential scanning calorimeter (DSC) plot of the polymer of Example 1.

FIG. 2 illustrates the 2nd heat differential scanning calorimeter (DSC) plot of the homopolymer of Example 1. The peak melting point was 126° C., and the percent crystallinity was 51% (148.7 J/g divided by 290 J/g).

Table I summarizes certain properties of the ethylene homopolymer of Example 1. Unexpectedly, the homopolymer had a beneficial combination of a very low density (0.915 g/cc, without the use of a comonomer), a broad molecular weight distribution (Mw/Mn of 9.5), and a significant amount of SCB's (6.7 per 1000 total carbon atoms), in which 82% (5.5 divided by 6.7) were methyl branches. Further, as illustrated in FIGS. 1-2, the homopolymer also had an inverse SCBD and a high peak melting temperature.

By selection of the particular catalyst component I (nickel diimine complex) and the particular catalyst component II (metallocene compound), and their relative amounts (weight ratio of catalyst component I to catalyst component II), ethylene homopolymers having various densities, LCB contents, SCB contents, methyl branch contents, molecular weight distributions (ratios of Mw/Mn and Mz/Mw, and Mw, Mn, and Mz), and thermal characteristics can be produced.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene homopolymer having (or characterized by):
a density of less than or equal to about 0.94 g/cm$^3$;
an inverse short chain branch distribution (SCBD); and
a number of short chain branches (SCB's) in a range from about 2 to about 20 SCB's per 1000 total carbon atoms;
wherein at least about 50% of the SCB's are methyl branches.

Aspect 2. An ethylene homopolymer having (or characterized by):
a density of less than or equal to about 0.94 g/cm$^3$;
an inverse short chain branch distribution (SCBD); and
a ratio of Mw/Mn in a range from about 2 to about 100;
wherein at least about 50% of the SCB's are methyl branches.

Aspect 3. The homopolymer defined in aspect 1 or 2, wherein the ethylene homopolymer has a density in any range disclosed herein, e.g., from about 0.89 to about 0.94, from about 0.90 to about 0.94, from about 0.91 to about 0.94, from about 0.905 to about 0.93, from about 0.91 to about 0.93 g/cm$^3$, etc.

Aspect 4. The homopolymer defined in any one of aspects 1-3, wherein the ethylene homopolymer has an inverse (or increasing) short chain branch distribution, e.g., the number of short chain branches (SCB's) per 1000 total carbon atoms of the polymer at Mw (or Mz) is greater than at Mn.

Aspect 5. The homopolymer defined in any one of aspects 1-4, wherein the ethylene homopolymer has an amount of SCB's that are methyl branches in any range disclosed herein, e.g., e.g., at least about 55%, at least about 60%, at least about 70%, at least about 75%, at least about 80%, etc.

Aspect 6. The homopolymer defined in any one of aspects 1-5, wherein the ethylene homopolymer has a number of short chain branches (SCB's) per 1000 total carbon atoms in any range disclosed herein, e.g., from about 2 to about 20, from about 3 to about 15, from about 4 to about 12, from about 5 to about 15, from about 5 to about 12, from about 4 to about 9 SCB's, etc.

Aspect 7. The homopolymer defined in any one of aspects 1-6, wherein the ethylene homopolymer has a ratio of

TABLE I

| | Example 1 | | | | | | |
|---|---|---|---|---|---|---|---|
| Example | Mn/1000 (g/mol) | Mw/1000 (g/mol) | Mz/1000 (g/mol) | Mp/1000 (g/mol) | Mw/Mn | Mz/Mw | IB |
| 1 | 27.4 | 261 | 1030 | 243 | 9.5 | 3.9 | 1.6 |

| Example | SCB's (per 1000 C) | Methyl (per 1000 C) | Ethyl (per 1000 C) | Propyl (per 1000 C) | Butyl (per 1000 C) | Pentyl (per 1000 C) | C$_6$+ (per 1000 C) |
|---|---|---|---|---|---|---|---|
| 1 | 6.7 | 5.5 | 1.2 | 0 | 0 | 0 | 0.9 |

| Example | Density (g/cc) | Peak Melting Point (° C.) | Crystallinity (%) |
|---|---|---|---|
| 1 | 0.915 | 126 | 51 |

Mw/Mn in any range disclosed herein, e.g., from about 4 to about 30, from about 4 to about 20, from about 5 to about 30, from about 5 to about 20, from about 8 to about 15, etc.

Aspect 8. The homopolymer defined in any one of aspects 1-7, wherein the ethylene homopolymer has a Mw in any range disclosed herein, e.g., from about 80,000 to about 800,000, from about 80,000 to about 500,000, from about 150,000 to about 800,000, from about 200,000 to about 600,000 g/mol, etc.

Aspect 9. The homopolymer defined in any one of aspects 1-8, wherein the ethylene homopolymer has a Mn in any range disclosed herein, e.g., from about 10,000 to about 60,000, from about 15,000 to about 55,000, from about 15,000 to about 45,000, from about 20,000 to about 40,000 g/mol, etc.

Aspect 10. The homopolymer defined in any one of aspects 1-9, wherein the ethylene homopolymer has a Mz in any range disclosed herein, e.g., from about 300,000 to about 3,000,000, from about 500,000 to about 2,000,000, from about 500,000 to about 1,500,000, from about 750,000 to about 1,250,000 g/mol, etc.

Aspect 11. The homopolymer defined in any one of aspects 1-10, wherein the ethylene homopolymer has a ratio of Mz/Mw in any range disclosed herein, e.g., from about 2 to about 8, from about 2.5 to about 7, from about 2.5 to about 5, from about 3 to about 6, etc.

Aspect 12. The homopolymer defined in any one of aspects 1-11, wherein the ethylene homopolymer has a melt index (MI, $I_2$) in any range disclosed herein, e.g., from 0 to about 25, from 0 to about 5, from about 0.1 to about 3, from about 0.1 to about 1 g/10 min, etc.

Aspect 13. The homopolymer defined in any one of aspects 1-12, wherein the ethylene homopolymer has a number of long chain branches (LCB's) per 1000 total carbon atoms in any range disclosed herein, e.g., from about 0.05 to about 10, from about 0.1 to about 8, from about 0.4 to about 6, from about 0.4 to about 4, from about 0.2 to about 3, from about 0.3 to about 2 LCB's, etc.

Aspect 14. The homopolymer defined in any one of aspects 1-13, wherein the ethylene homopolymer has a peak melting point in any melting temperature range disclosed herein, e.g., from about 120 to about 135° C., from about 120 to about 132° C., from about 120 to about 130° C., etc.

Aspect 15. The homopolymer defined in any one of aspects 1-14, wherein the ethylene homopolymer has a percent crystallinity in any range disclosed herein, e.g., from about 30% to about 75%, from about 35% to about 70%, from about 45% to about 60%, etc.

Aspect 16. The homopolymer defined in any one of aspects 1-15, wherein the ethylene homopolymer has a bimodal or multimodal molecular weight distribution.

Aspect 17. The homopolymer defined in any one of aspects 1-16, wherein the ethylene homopolymer is a single reactor product, e.g., not a post-reactor blend of two polymers, for instance, having different molecular weight characteristics.

Aspect 18. The homopolymer defined in any one of aspects 1-17, wherein the ethylene homopolymer further comprises at least one additive selected from an antioxidant, an acid scavenger, an antiblock additive, a slip additive, a colorant, a filler, a processing aid, a UV inhibitor, etc., or any combination thereof.

Aspect 19. An article of manufacture comprising the ethylene homopolymer defined in any one of aspects 1-18.

Aspect 20. An article comprising the ethylene homopolymer defined in any one of aspects 1-18, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 21. A film, pipe, or molded product comprising the ethylene homopolymer defined in any one of aspects 1-18.

Aspect 22. A catalyst composition comprising:
catalyst component I comprising any suitable nickel diimine complex or any nickel diimine complex disclosed herein, catalyst component II comprising any suitable metallocene compound or any metallocene compound disclosed herein, any suitable activator or any activator disclosed herein, and optionally, any suitable co-catalyst or any co-catalyst disclosed herein.

Aspect 23. The composition defined in aspect 22, wherein catalyst component II comprises a bridged zirconium or hafnium based metallocene compound.

Aspect 24. The composition defined in aspect 22, wherein catalyst component II comprises a bridged zirconium or hafnium based metallocene compound with an alkenyl substituent.

Aspect 25. The composition defined in aspect 22, wherein catalyst component II comprises a single atom bridged metallocene compound having an alkyl and/or an aryl group substituent on the bridging atom.

Aspect 26. The composition defined in aspect 22, wherein catalyst component II comprises a single atom bridged metallocene compound containing a cyclopentadienyl group (e.g., a bridged bis-cyclopentadienyl metallocene compound).

Aspect 27. The composition defined in aspect 22, wherein catalyst component II comprises a single atom bridged metallocene compound containing a fluorenyl group.

Aspect 28. The composition defined in aspect 22, wherein catalyst component II comprises an unbridged zirconium or hafnium based metallocene compound containing two cyclopentadienyl groups, two indenyl groups, or a cyclopentadienyl and an indenyl group.

Aspect 29. The composition defined in aspect 22, wherein catalyst component II comprises an unbridged zirconium or hafnium based metallocene compound containing two cyclopentadienyl groups.

Aspect 30. The composition defined in aspect 22, wherein catalyst component II comprises an unbridged zirconium or hafnium based metallocene compound containing two indenyl groups.

Aspect 31. The composition defined in aspect 22, wherein catalyst component II comprises an unbridged zirconium or hafnium based metallocene compound containing a cyclopentadienyl and an indenyl group.

Aspect 32. The composition defined in any one of aspects 22-31, wherein the activator comprises an activator-support, an aluminoxane compound, an organoboron or organoborate compound, an ionizing ionic compound, or any combination thereof.

Aspect 33. The composition defined in any one of aspects 22-32, wherein the activator comprises an aluminoxane compound.

Aspect 34. The composition defined in any one of aspects 22-32, wherein the activator comprises an organoboron or organoborate compound.

Aspect 35. The composition defined in any one of aspects 22-32, wherein the activator comprises an ionizing ionic compound.

Aspect 36. The composition defined in any one of aspects 22-32, wherein the activator comprises an activator-support, the activator-support comprising any solid oxide treated with any electron-withdrawing anion disclosed herein.

Aspect 37. The composition defined in any one of aspects 22-32, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 38. The composition defined in any one of aspects 22-32, wherein the activator comprises fluorided alumina, sulfated alumina, fluorided silica-alumina, sulfated silica-alumina, fluorided silica-coated alumina, sulfated silica-coated alumina, or any combination thereof.

Aspect 39. The composition defined in any one of aspects 22-32, wherein the activator comprises a fluorided solid oxide and/or a sulfated solid oxide.

Aspect 40. The composition defined in any one of aspects 36-39, wherein the activator further comprises any metal or metal ion disclosed herein, e.g., zinc, nickel, vanadium, titanium, silver, copper, gallium, tin, tungsten, molybdenum, zirconium, or any combination thereof.

Aspect 41. The composition defined in any one of aspects 22-40, wherein the catalyst composition comprises a co-catalyst, e.g., any suitable co-catalyst.

Aspect 42. The composition defined in any one of aspects 22-41, wherein the co-catalyst comprises any organoaluminum compound disclosed herein.

Aspect 43. The composition defined in aspect 42, wherein the organoaluminum compound comprises trimethylaluminum, triethylaluminum, triisobutylaluminum, or a combination thereof.

Aspect 44. The composition defined in any one of aspects 36-43, wherein the catalyst composition comprises catalyst component I, catalyst component II, a solid oxide treated with an electron-withdrawing anion, and an organoaluminum compound.

Aspect 45. The composition defined in any one of aspects 36-44, wherein the catalyst composition is substantially free of aluminoxane compounds, organoboron or organoborate compounds, ionizing ionic compounds, or combinations thereof.

Aspect 46. The composition defined in any one of aspects 22-45, wherein a weight ratio of catalyst component I to catalyst component II in the catalyst composition is in any range disclosed herein, e.g., from about 10:1 to about 1:10, from about 5:1 to about 1:5, from about 2:1 to about 1:2, etc.

Aspect 47. The composition defined in any one of aspects 22-46, wherein the catalyst composition is produced by a process comprising contacting, in any order, catalyst component I, catalyst component II, and the activator.

Aspect 48. The composition defined in any one of aspects 22-46, wherein the catalyst composition is produced by a process comprising contacting, in any order, catalyst component I, catalyst component II, the activator, and the co-catalyst.

Aspect 49. The composition defined in any one of aspects 22-48, wherein a catalyst activity of the catalyst composition is in any range disclosed herein, e.g., at least about 15,000, from about 10,000 to about 250,000, from about 20,000 to about 100,000 grams, etc., of ethylene polymer per gram of nickel (or per gram of transition metal of the metallocene compound) per hour, under slurry polymerization conditions, with a triisobutylaluminum co-catalyst, using pentane as a diluent, and with a polymerization temperature of 60° C. and a reactor pressure of 300 psig.

Aspect 50. A polymerization process, the process comprising contacting the catalyst composition defined in any one of aspects 22-49 with ethylene and an optional olefin comonomer in a polymerization reactor system under polymerization conditions to produce an ethylene polymer.

Aspect 51. The process defined in aspect 50, wherein the olefin comonomer comprises a $C_3$-$C_{20}$ alpha-olefin.

Aspect 52. The process defined in aspect 50, wherein the catalyst composition is contacted with ethylene and an olefin comonomer comprising a $C_3$-$C_{10}$ alpha-olefin.

Aspect 53. The process defined in aspect 50, wherein the catalyst composition is contacted with ethylene and an olefin comonomer comprising 1-butene, 1-hexene, 1-octene, or a mixture thereof.

Aspect 54. The process defined in any one of aspects 50-53, wherein the polymerization reactor system comprises a batch reactor, a slurry reactor, a gas-phase reactor, a solution reactor, a high pressure reactor, a tubular reactor, an autoclave reactor, or a combination thereof.

Aspect 55. The process defined in any one of aspects 50-54, wherein the polymerization reactor system comprises a slurry reactor, a gas-phase reactor, a solution reactor, or a combination thereof.

Aspect 56. The process defined in any one of aspects 50-55, wherein the polymerization reactor system comprises a loop slurry reactor.

Aspect 57. The process defined in any one of aspects 50-56, wherein the polymerization reactor system comprises a single reactor.

Aspect 58. The process defined in any one of aspects 50-56, wherein the polymerization reactor system comprises 2 reactors.

Aspect 59. The process defined in any one of aspects 50-56, wherein the polymerization reactor system comprises more than 2 reactors.

Aspect 60. The process defined in any one of aspects 50-59, wherein the ethylene polymer comprises any ethylene polymer disclosed herein.

Aspect 61. The process defined in any one of aspects 50-60, wherein the ethylene polymer comprises an ethylene homopolymer.

Aspect 62. The process defined in any one of aspects 50-60, wherein the ethylene polymer comprises an ethylene/1-butene copolymer, an ethylene/1-hexene copolymer, and/or an ethylene/1-octene copolymer.

Aspect 63. The process defined in any one of aspects 50-62, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 64. The process defined in any one of aspects 50-63, wherein the polymerization conditions are substantially constant, e.g., for a particular polymer grade.

Aspect 65. The process defined in any one of aspects 50-64, wherein no hydrogen is added to the polymerization reactor system.

Aspect 66. The process defined in any one of aspects 50-64, wherein hydrogen is added to the polymerization reactor system.

Aspect 67. The process defined in any one of aspects 50-66, wherein the ethylene polymer produced is defined in any one of aspects 1-18.

Aspect 68. An ethylene polymer produced by the polymerization process defined in any one of aspects 50-66.

Aspect 69. An ethylene homopolymer defined in any one of aspects 1-18 produced by the process defined in any one of aspects 50-66.

Aspect 70. An article comprising the polymer defined in any one of aspects 68-69.

We claim:

1. An ethylene homopolymer having:
a density of less than or equal to about 0.925 g/cm$^3$;
a number of short chain branches (SCB's) in a range from about 3 to about 15 SCB's per 1000 total carbon atoms; and
a number of SCB's per 1000 total carbon atoms of the homopolymer at Mw that is greater than at Mn;
wherein at least about 50% of the SCB's are methyl branches.

2. The homopolymer of claim 1, wherein the homopolymer is further characterized by a number of SCB's per 1000 total carbon atoms at Mz that is greater than at Mn.

3. The homopolymer of claim 1, wherein:
the density is in a range from about 0.905 to about 0.922 g/cm$^3$;
the number of SCB's per 1000 total carbon atoms is in a range from about 4 to about 12; and
at least about 70% of the SCB's are methyl branches.

4. An article of manufacture comprising the homopolymer of claim 3.

5. The homopolymer of claim 1, wherein the homopolymer is further characterized by:
a ratio of Mw/Mn in a range from about 5 to about 20; and
a ratio of Mz/Mw in a range from about 2.5 to about 7.

6. The homopolymer of claim 1, wherein the homopolymer is further characterized by:
a Mw in a range from about 80,000 to about 500,000 g/mol;
a Mn in a range from about 10,000 to about 60,000 g/mol; and
a Mz in a range from about 500,000 to about 2,000,000 g/mol.

7. The homopolymer of claim 1, wherein the homopolymer is further characterized by:
a number of long chain branches (LCB's) per 1000 total carbon atoms in a range from about 0.1 to about 8;
a peak melting point in a temperature range from about 120 to about 132° C.; and
a percent crystallinity in a range from about 35 to about 70%.

8. An article of manufacture comprising the homopolymer of claim 7.

9. An ethylene homopolymer having:
a density in a range from about 0.90 to about 0.925 g/cm$^3$;
a number of long chain branches (LCB's) per 1000 total carbon atoms in a range from about 0.3 to about 2;
a number of SCB's per 1000 total carbon atoms of the homopolymer at Mw that is greater than at Mn; and
a ratio of Mw/Mn in a range from about 2 to about 100;
wherein at least about 50% of the SCB's are methyl branches.

10. An article of manufacture comprising the homopolymer of claim 9.

11. The homopolymer of claim 9, wherein the homopolymer is further characterized by a number of SCB's per 1000 total carbon atoms at Mz that is greater than at Mn.

12. The homopolymer of claim 9, wherein:
the density is in a range from about 0.905 to about 0.922 g/cm$^3$;
the ratio of Mw/Mn is in a range from about 6 to about 16; and
at least about 75% of the SCB's are methyl branches.

13. An article of manufacture comprising the homopolymer of claim 12.

14. The homopolymer of claim 9, wherein the ratio of Mw/Mn is in a range from about 4 to about 30.

15. The homopolymer of claim 9, wherein the homopolymer is further characterized by:
a Mw in a range from about 150,000 to about 800,000 g/mol;
a Mn in a range from about 15,000 to about 45,000 g/mol; and
a Mz in a range from about 500,000 to about 2,000,000 g/mol.

16. The homopolymer of claim 9, wherein the homopolymer is further characterized by:
a number of short chain branches (SCB's) per 1000 total carbon atoms in a range from about 4 to about 9;
a peak melting point in a temperature range from about 120 to about 130° C.; and
a percent crystallinity in a range from about 45 to about 60%.

17. An article of manufacture comprising the homopolymer of claim 16.

18. A polymerization process comprising:
contacting a catalyst composition with ethylene and an optional olefin comonomer in a polymerization reactor system under polymerization conditions to produce an ethylene polymer, wherein:
the catalyst composition comprises a nickel diimine complex, a metallocene compound, and an activator; and
the ethylene polymer is characterized by:
a density of less than or equal to about 0.925 g/cm$^3$;
a number of short chain branches (SCB's) in a range from about 3 to about 15 SCB's per 1000 total carbon atoms; and
a number of SCB's per 1000 total carbon atoms of the polymer at Mw that is greater than at Mn; and
wherein at least about 50% of the SCB's are methyl branches.

19. The process of claim 18, wherein:
the ethylene polymer comprises an ethylene homopolymer;
the catalyst composition further comprises a co-catalyst; and
the polymerization reactor system comprises a slurry reactor, a gas-phase reactor, a solution reactor, or a combination thereof.

20. The process of claim 19, wherein the ethylene homopolymer is further characterized by:
a ratio of Mw/Mn in a range from about 5 to about 30.

* * * * *